United States Patent [19]

Isoguchi et al.

[11] Patent Number: 4,586,806
[45] Date of Patent: May 6, 1986

[54] CAMERA RANGE FINDER

[75] Inventors: Seiichi Isoguchi, Japan; Hiroshi Takahashi, both of Hachioji

[73] Assignee: Konishiroku Photo Industry Co., Ltd., Tokyo, Japan

[21] Appl. No.: 579,019

[22] Filed: Feb. 10, 1984

[30] Foreign Application Priority Data

Feb. 14, 1983 [JP] Japan ................... 58-23179

[51] Int. Cl.⁴ .............................. G03B 3/00
[52] U.S. Cl. ................................ 354/403
[58] Field of Search ........................ 354/403

[56] References Cited

U.S. PATENT DOCUMENTS

| | | | |
|---|---|---|---|
| 3,906,389 | 9/1975 | Matsumoto et al. | 354/403 |
| 3,999,192 | 12/1976 | Hosoe et al. | 354/403 |
| 4,477,168 | 10/1984 | Hosoe | 354/403 |
| 4,494,848 | 1/1985 | Ogawa | 354/403 |
| 4,497,560 | 2/1985 | Nagaoka et al. | 354/403 |
| 4,502,773 | 3/1985 | Gaewsky et al. | 354/403 |

*Primary Examiner*—Russell E. Adams
*Attorney, Agent, or Firm*—Jordan B. Bierman

[57] ABSTRACT

The invention relates to an active type camera rangefinder for automatic focus. A beam of infrared light is emitted towards an object and the light reflected back from the object is received by a plurality of photo transistors. An automatic gain control adjusts the sensitivity of the phototransistors. An RC circuitry delays operation of the automatic gain control to eliminate low-frequency ripples caused by fluorescent lamps.

4 Claims, 4 Drawing Figures

CAMERA RANGE FINDER

BACKGROUND OF THE INVENTION

1. Field of the Invention

This invention relates to a camera rangefinder and, more particularly, to an active type rangefinder usable with a camera equipped with an auto-focus (AF) device, the active type rangefinder comprises a light-emitting unit and a light-receiving unit and measures a distance in the manner that ray of light is emitted by the light-emitting unit and the ray of light reflected from a subject are received by the light-receiivng unit.

2. Description of the Prior Art

Various active type rangefinders have so far been used with cameras. FIG. 1 illustrates the concept of the active type rangefinders. In the drawing, AF camera 1 is equipped with taking-lens 2, light-emitting unit 3 for measuring a distance and light-receiving unit 4 for the same. Infrared beams are emitted pulsewise from light-emitting unit 3 and are then made parallel to each other through lens 31 disposed in front of light-emitting unit 3 so as to emit in the direction intersecting them with the optical axis of camera 1 at a predetermined distance ahead from camera 1.

FIG. 2 is a circuit diagram of light-emitting unit 3. In the drawing, light-emitting element, IR-LED, is a light-emitting diode emitting infrared beams and is regulated by transistor $Tr_1$ so as to emit infrared beams upon charging capacitor $C_1$ for light-emitting.

The infrared beams emitted from light-emitting unit 3 hit a subject and reflect therefrom. Light-receiving unit 4 is provided with condensing lens 41 in the front thereof and light-receiving element 42 at the focal point behind condensing lens 41, respectively. The reflected beams from subject Sa at a short-distance form an optical image centering at Pa on light-receiving element 42, and the reflected beams from subject Sb at a long-distance form an optical image centering at Pb on light-receiving element 42 as well. There have been used light-receiving elements 42 such as a position sensitive detecting element, PSD, and the like by which an electric signal is generated corresponding to the position of an optical image luminance center. Distance has been measured by the electric signals generated by light-receiving element 42.

OBJECTS AND SUMMARY OF THE INVENTION

It is an object of the invention to provide a camera rangefinder of an active type, whereby a subject is accurately judged whether it is at point farther or nearer than the point at a predetermined distance from the subject and the circuit thereof is simplified.

The abovementioned object of the invention can be achieved by a rangefinder comprising a light-emitting means to radiate light to an object; a light receiving means having two phototransistors with bases to receive the reflected ray of light from said object; an automatic gain control circuit to apply an automatic gain control to the output signals generated by said light receiving means; and an operation circuit for operating on the output signals of said light receiving means for producing a distance signal representing the distance between distance between said object and said light receiving means.

DESCRIPTION OF THE PREFERRED EMBODIEMENTS

Figure 1:
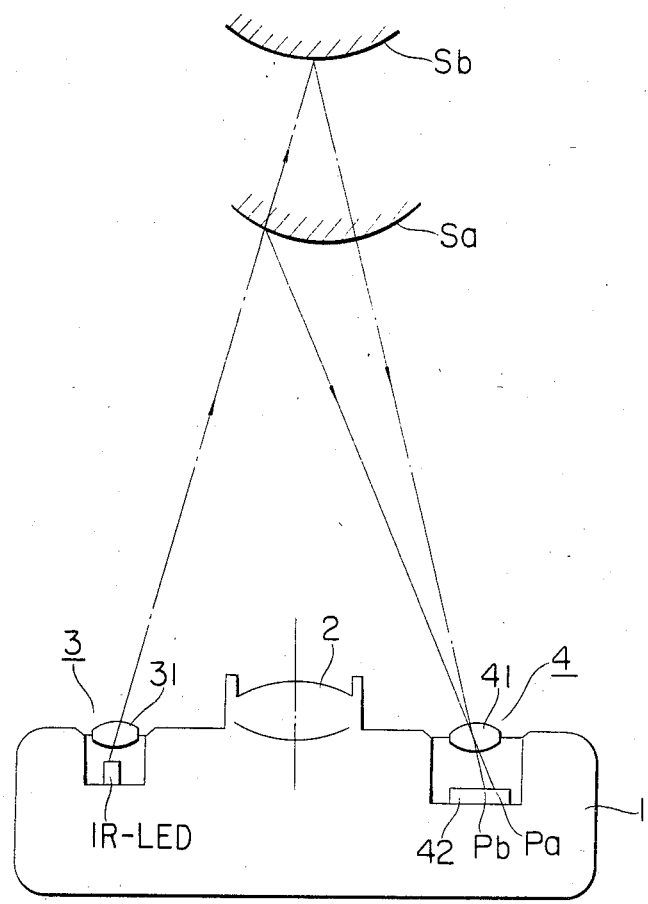
FIG. 1 illustrates a conceptual view of an active type rangefiner.
Figure 2:
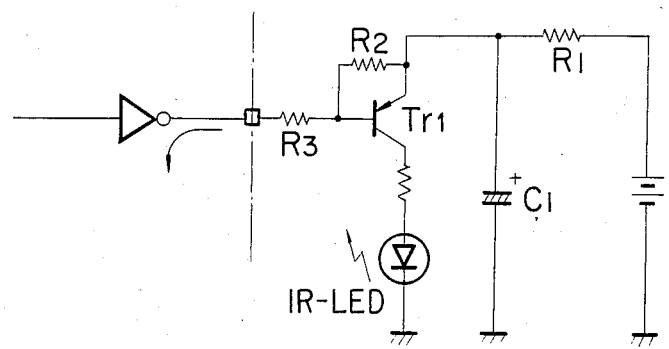
FIG. 2 is a circuit diagram of the light-emitting unit of the active type rangefinder.
Figure 3:
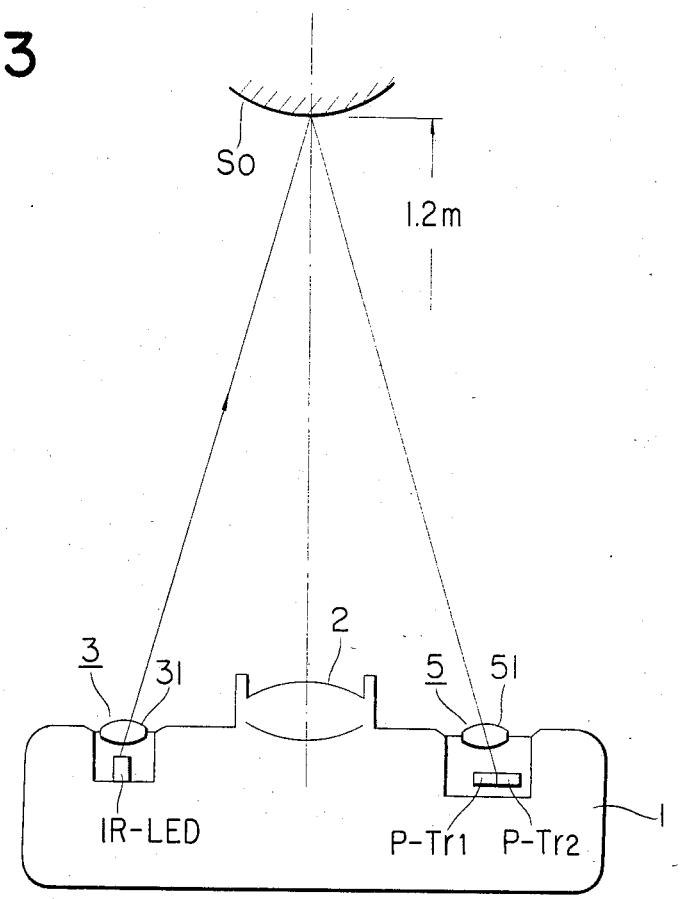
FIG. 3 is a view conceptually illustrating an active type rangefinder of the invention.

Light-emitting unit 3 shown in FIG. 3 uses, for example a light-emitting element and the circuit for light-emitting unit 3 shown in FIG. 2.

On the other hand, behind condenser lens 51 of the light-receiving unit 5, there are disposed two pieces of phototransistors, P-$Tr_1$, P-$Tr_2$ on the focal plane so as to be adjacent to each other. Both of the phototransistors used therein are those attached with bases and and are the same in characteristics. Now, when trying to measure the distances to a far point and a near point provided that distance of 1.2 m is predetermined as a switching point of a far point to or from a near point, reflecting object So is put in a position 1.2 m before camera 1 and an adjustment is done in the manner that infrared beams emitted from light-emitting unit 3 are reflected by reflecting object So and are then hit evenly on phototransistors P-$Tr_1$, P-$Tr_2$ so that the photoelectric currents from them may be equalized. The outputs of light-receiving unit thus adjusted are used for measuring a distance through the circuit shown in FIG. 4.

Figure 4:
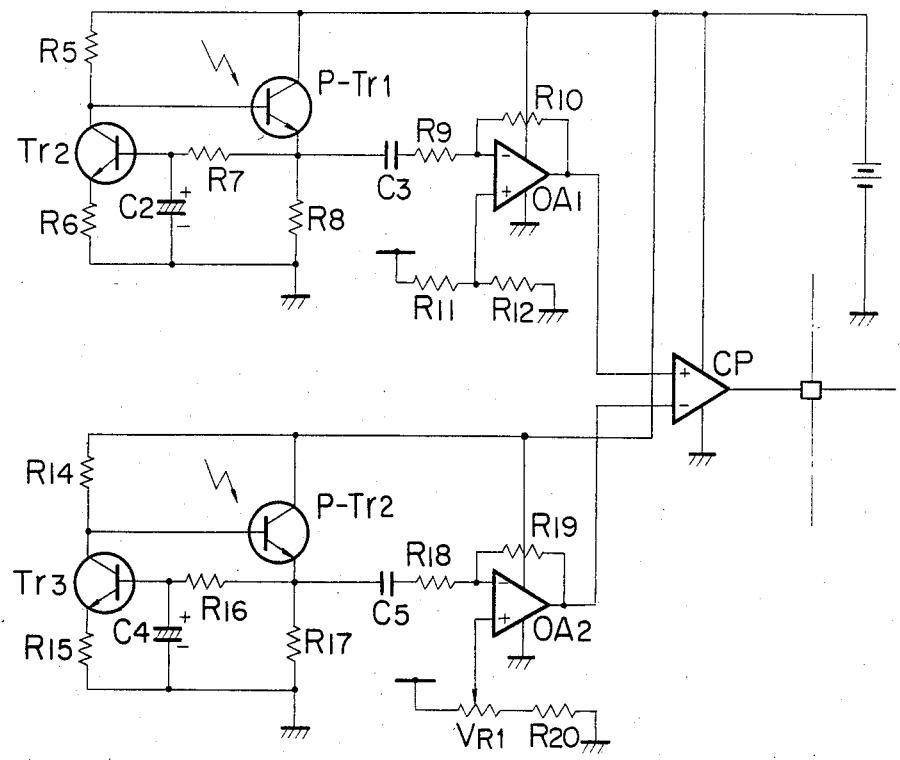
FIG. 4 illustrates the circuit diagram of a light-receiving unit of the invention.

In FIG. 4, the photoelectric currents generated by phototransistors P-$Tr_1$, P-$Tr_2$ are taken respectively in the form of voltage and each resulting voltage is amplified upon inverting by operational amplifiers $OA_1$, $OA_2$ so as to compare each other by comparator CP, and thus, a judgement is made whether the distance measured is farther or nearer than the predetermined distance of 1.2 m, according to the comparison of the amplified voltage. Operational amplifiers $OA_1$, $OA_2$ each used in this embodiment have the amplification factor to about thirty, and a less-drift operational amplifiers are selected for this purpose.

In the invention, phototransistors each with a base are used for phototransistors P-$Tr_1$, P-$Tr_2$, and chip type NPN transistors $Tr_2$, $Tr_3$ are provided as AGC to the bases of phototransistors P-$Tr_1$, P-$Tr_2$. If an excessive current is going to flow through phototransistors P-$Tr_1$, P-$Tr_2$, negative feedback is applied by flowing the base currents of phototransistors P-$Tr_1$, P-$Tr_2$ to the collectors of transistors $Tr_2$, $Tr_3$ so that the operating points each may be kept constant.

Either of CR($C_2$-$R_7$, $C_4$-$R_{17}$) is to eliminate low-frequency ripples caused by a fluorescent lamp and the like, and is to determine a frequency to be applied to AGC. When the value of CR is made smaller, AGC is also applied to a high frequency range. In this example, the light-emitting pulse width was about 280μs and the fundamental frequency was about 1.8 KHz. Therefore, the AGC was selected so as not to apply at this frequency but to apply to an A.C. light of the order of 100, 120 Hz such as that of a fluorescent lamp. Even if some characteristics of a fluorescent lamp should remain, they are applied all in the same manner to the two channels in the form of signals. There is accordingly almost no measurement problem.

As described above, the light-emitting pulse width in this example was about 280µs. However, the AGC used in the invention was readily selected so that it may not be applied to such a pulse having the width of 50 to 500µs, but may be effectively worked to an AC light of the order of a fluorescent lamp.

As described with reference to the example, the invention has provided a camera rangefinder in which AGC is applied to the output signals each of two pieces of phototransistors provided adjacent to each other to input each of the signals to a comparator circuit so that the phototransistors may be avoided from saturating by the invention and a distance may be measured even under a very wide and bright photographing condition, that is, the structure and the avoidance from such a saturation may be simplified and no erroneous judgement may be made even under a highly illuminating condition.

What is claimed is:

1. A camera, comprising:
    a light-emitting means for emitting light to an object;
    a plurality of phototransistors which generate electric signals corresponding to the light reflected from the object;
    automatic gain control means for controlling each of the phototransistors;
    means for delaying operations of the automatic gain control means for a predetermined period of time;
    an operable circuit for generating a distance signal between the camera and the object from the electric signals.

2. The camera defined in claim 1 wherein the number of the phototransistors are two.

3. The camera defined in claim 2 wherein said two phototransistors are provided adjacent to each other, and the operation circuit comprises a comparator which compares output signals from said two phototransistors and produces the distance signal representing whether the distance is longer or shorter than a predetermined distance.

4. The camera defined in claim 1 wherein the light is emitted by a light-emittion pulse having the width within the range of fifty to five hundred microseconds.

* * * * *